July 13, 1937.  J. BRATKOWSKI  2,087,137
RAT TRAP
Filed June 13, 1935  2 Sheets-Sheet 1
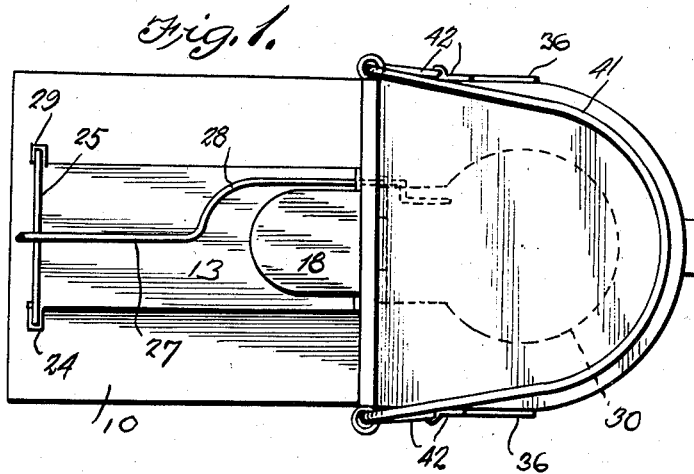
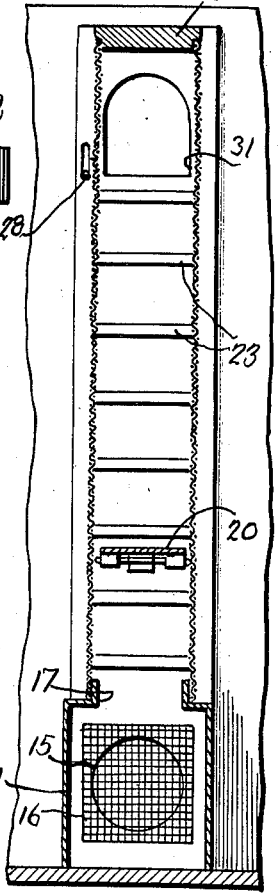
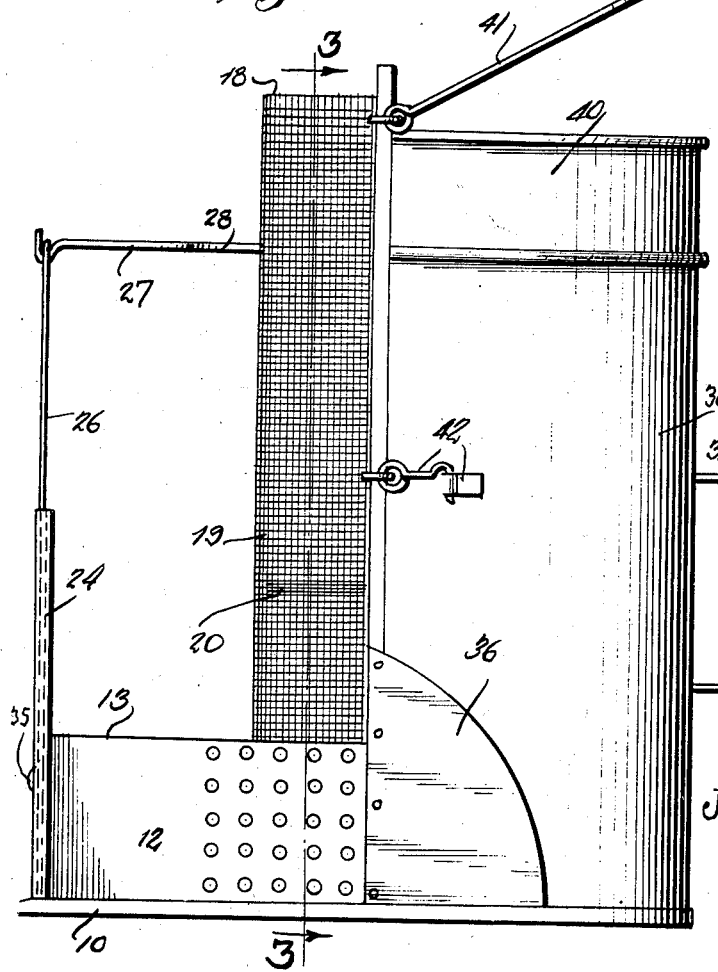
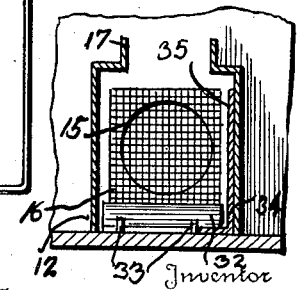
Inventor
Joseph Bratkowski.

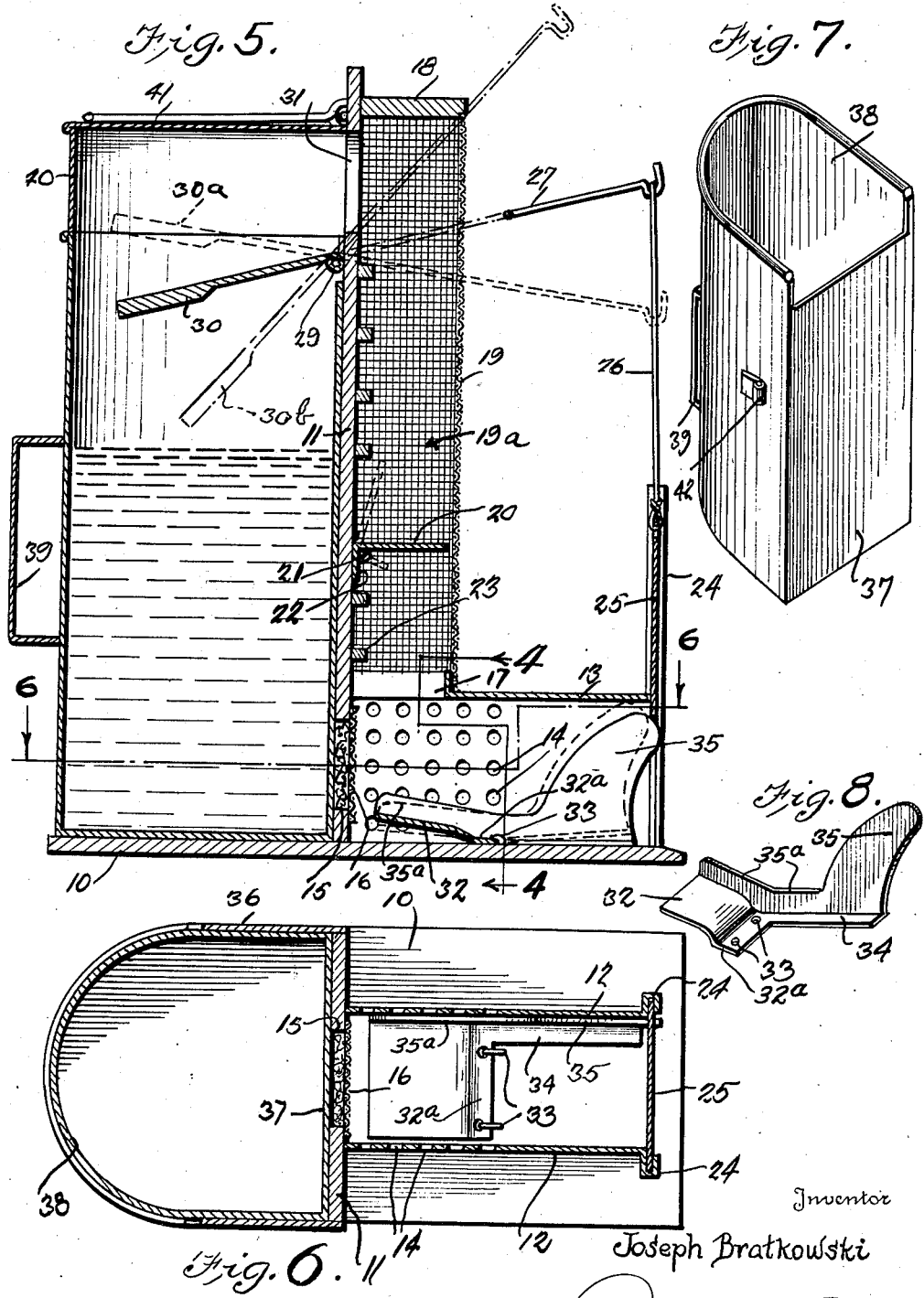

Patented July 13, 1937

2,087,137

UNITED STATES PATENT OFFICE 2,087,137

RAT TRAP

Joseph Bratkowski, Toronto, Ontario, Canada

Application June 13, 1935, Serial No. 26,491

1 Claim. (Cl. 43—76)

This invention relates to certain new and useful improvements in rat traps.

The primary object of the invention is to provide a rat trap having an entrance chamber with a sliding trap door normally retained in an elevated open position relative to the entrance opening to the chamber by means of a trip lever that is operated by a rat for releasing the trap door to close the exit from the chamber with the trap door re-set in open position by a trip device passed over by the rat in its passage through the trap with a water receptacle into which the rat is precipitated for drowning.

A further object of the invention is to provide a rat trap of the foregoing character with a novel form of trip lever within the entrance chamber for a trap door thereto that automatically shifts to set position with respect to the trap door when the latter is elevated into an open position by the weight of a rat in passing over a second trip member within the trap.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a top plan view of a rat trap constructed in accordance with the present invention;

Figure 2 is a side elevational view of the same;

Figure 3 is a vertical cross-sectional view taken on line 3—3 of Figure 2;

Figure 4 is a detail sectional view taken on line 4—4 of Figure 5, showing the screened bait compartment adjacent the entrance chamber to the trap;

Figure 5 is a vertical longitudinal sectional view showing the trap door in elevated set position with the trip lever in the entrance chamber illustrated in its released dotted line position and the re-setting means for the trap door illustrated in dotted line position;

Figure 6 is a horizontal sectional view taken on line 6—6 of Figure 5;

Figure 7 is a perspective view of the water receptacle into which the rat is precipitated and illustrated in its detached relation to the trap; and Figure 8 is a perspective view of the trip lever in the entrance chamber for the trap door.

Referring more in detail to the accompanying drawings, there is illustrated a mouse or rat trap comprising a base plate 10 having a perpendicular wall 11 rising therefrom intermediate its ends and of the same width as the base plate, the wall and plate forming supports for the structural elements of the trap.

The trap includes an entrance chamber, preferably rectangular in cross-section as shown in Figs. 3 and 4, defined by perpendicular side walls 12 and a top wall 13, the entrance chamber extending from the perpendicular wall 11 substantially to one end of the base plate 10 with the edges of the side walls suitably secured to the base plate and wall. Openings 14 are provided in the side walls 12 of the entrance chamber for the admission of light. An opening 15 is provided in the lower end of the perpendicular wall 11 in line with the entrance chamber for the support of bait that is closed to the entrance chamber by means of the screen covering 16.

The top wall 13 of the entrance chamber adjacent the perpendicular wall 11 is provided with an arcuate opening bordered by an upstanding flange 17 and the upper end of the perpendicular wall carries a laterally projecting block 18 of the same configuration as the flange 17 and overlying the latter, the flange and block having secured thereto a curved screen 19 providing a perpendicular passage 19a that is closed at its upper end and in communication at its lower end with the entrance chamber. A trip plate 20 is pivotally mounted as at 21 within the passageway 19a to the forward side of the perpendicular wall 11 and has an end extension 22 adjacent the hinged mounting 21 to act as an abutment for normally holding the trip plate in the horizontal position as shown by full lines in Fig. 5, the trip plate 20 being freely movable in an upward direction as illustrated by dotted lines in Fig. 5 for the upward passage of a rat through the passageway 19a, but acting to prevent downward movement of the rat within the passageway. The front face of the perpendicular wall 11 within the passageway 19 is provided with rails or steps 23 to facilitate upward passage of the rat through the passageway.

A trap door is slidably associated with the outer open end of the entrance chamber, the side walls 12 of the entrance chamber each carrying a vertical channel guide 24 extending above the side walls for guiding the vertically sliding movements of the trap door 25 as will be understood from an inspection of Figure 6 and said trap door 25 has a cord connection 26 at its upper end with a rod 27 that has a bent portion 28 positioned laterally of the screened passageway 19a as shown in Fig. 1 with the inner end thereof angularly bent and located at the rear side of the perpendicular wall 11 to provide a hinge pin or bearing 29 to which the adjacent end of an operating trip plate 30 is secured for re-setting the trap door 25. An opening 31 in the perpendicular wall 11 forms communication between the screened passageway 19a and the operating trip plate 30.

The device for holding the trap door 25 in its raised set position shown in Figs. 5 and 8, comprises a trip lever pivoted as at 33 to the bottom wall of the entrance chamber and normally maintained in an inclined position as illustrated by means of the forwardly directed leg 34 and upwardly extending curved arm 35 that overbalances the trip lever. The upper end of the trip arm 35 projects into the entrance opening to the entrance chamber and in the path of descending movement of the trap door 25 and said trap door is of a weight to overcome the weight of the operating trip plate 30 when the trip lever is operated to move the trip arm 35 to the dotted line position shown in Fig. 5 and out of the descending path of movement of the trap door 25, the trap door remaining in its lowered closed position until reset by the rat in passing over the operating trip plate 30. More specifically, the trip lever includes a rearwardly and upwardly extending treadle portion 32 having a transverse leg 32a at the lower forward edge thereof, the leg 34 being in the plane of the transverse leg 32a. A side flange 35a projects perpendicularly from the outer side of the leg 34, the adjacent side of the treadle portion 32 and adjacent end of the transverse leg 32a with the trip arm 35 rising from the forward end of the flange 35a. The side flange 35a as shown in Figure 6, has wiping contact with the adjacent side wall 12 of the entrance chamber to aid in holding the trip plate in set position.

A segmental guide plate 36 is carried by each lower side edge of the perpendicular wall 11 and projects rearwardly thereof for centering the water receptacle shown in detail in Figure 7 as having a flat perpendicular wall 37 for engaging the rear side of the perpendicular wall 11 and curved side and outer end walls 38, the water receptacle being provided with a handle 39 to facilitate placement and removal thereof. The upper end of the water receptacle terminates adjacent the lower end of the opening 31 in the upper end of the perpendicular wall 11 and said wall above the opening 31 carries a hood 40 that is fixed thereto, the hood providing a closure for the upper end of the water receptacle when the latter is mounted upon the base plate 10 that is shown in Figs. 2 and 5. A bail handle 41 is carried by the upper end of the perpendicular wall 11 to facilitate handling of the trap and hook and eye connections 42 are formed between the side edges of the perpendicular wall and water receptacle for retaining the latter in assembled position relative to the trap.

The trap is illustrated in its set position by full lines in Fig. 5. When a rat or other rodent passes through the entrance opening to the entrance chamber for reaching the bait confined in the opening 15 rearwardly of the screen 16, the weight of the rat upon the trip lever moves the same on its pivot mounting 33 to shift the trip arm 35 from the full to the dotted line positions shown in Fig. 5, at which time the trap door 25 descends to its closed position and the operating trip plate 30 moves to the upper dotted line position 30a. The rat in attempting to escape finds an outlet through the perpendicular passageway 19a and passes by the trip plate 20 by moving the same in an upward direction as illustrated by dotted lines, the lowering movement of the trip plate 20 preventing downward movement of the rat for re-entering the entrance chamber. The rat travels further upwardly through the passageway 19a and through the opening 31 in the upper end of the perpendicular wall 11 to mount the operating trip plate 30 when in the position shown at 30a, the weight of the rat causing descending movement of the trip plate 30 to the position shown at 30b with the rat precipitated into the water receptacle and the trap door 25 elevated to permit pivotal movement of the trip lever and projection of the arm 35 into the downward path of movement of the trap door 25 for the re-setting of the trap door.

From the above detailed description of the invention, it is believed that the construction and operation thereof will at once be apparent, and while there is herein shown and described the preferred embodiment of the invention, it is nevertheless to be understood that minor changes may be made therein without departing from the spirit and scope of the invention as claimed.

I claim:—

A trip lever for a rat trap having a slidable entrance door, consisting of a portion in a horizontal plane, a treadle portion extending rearwardly therefrom and curved in an upward direction, a portion in a plane perpendicular to the horizontal portion and at one side thereof, said horizontal portion having openings therein adapted for pivotal connection to a rat trap base, and said perpendicular portion having its upper edge of curved formation adapted to have a camming effect on the slidable entrance door.

JOSEPH BRATKOWSKI.